April 1, 1930. W. G. WOHLHUTER 1,752,715
WINDSHIELD HEATER
Filed April 9, 1929   2 Sheets-Sheet 1
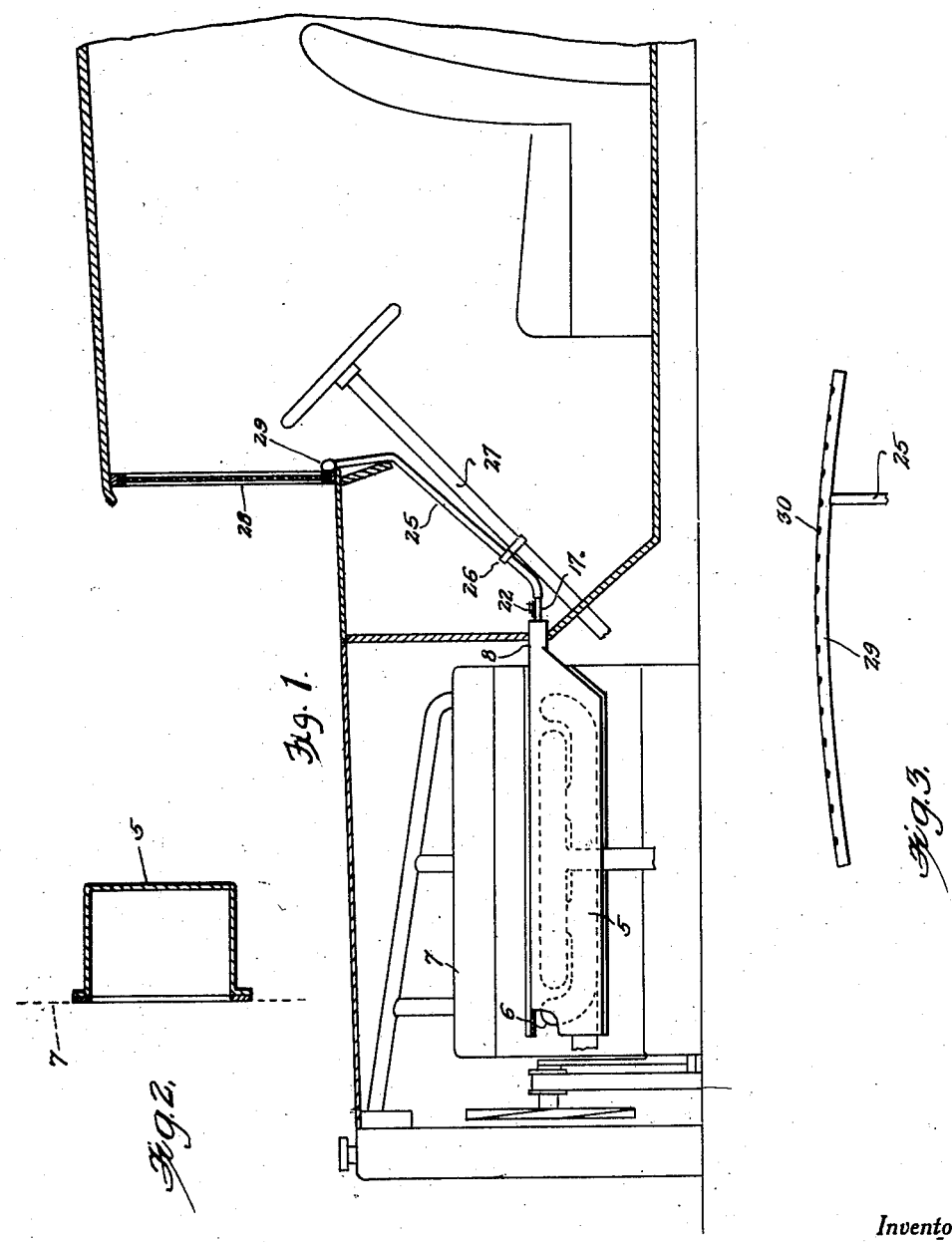
Inventor
William G. Wohlhuter,
By Clarence A. O'Brien
Attorney April 1, 1930.  W. G. WOHLHUTER  1,752,715
WINDSHIELD HEATER
Filed April 9, 1929  2 Sheets-Sheet 2
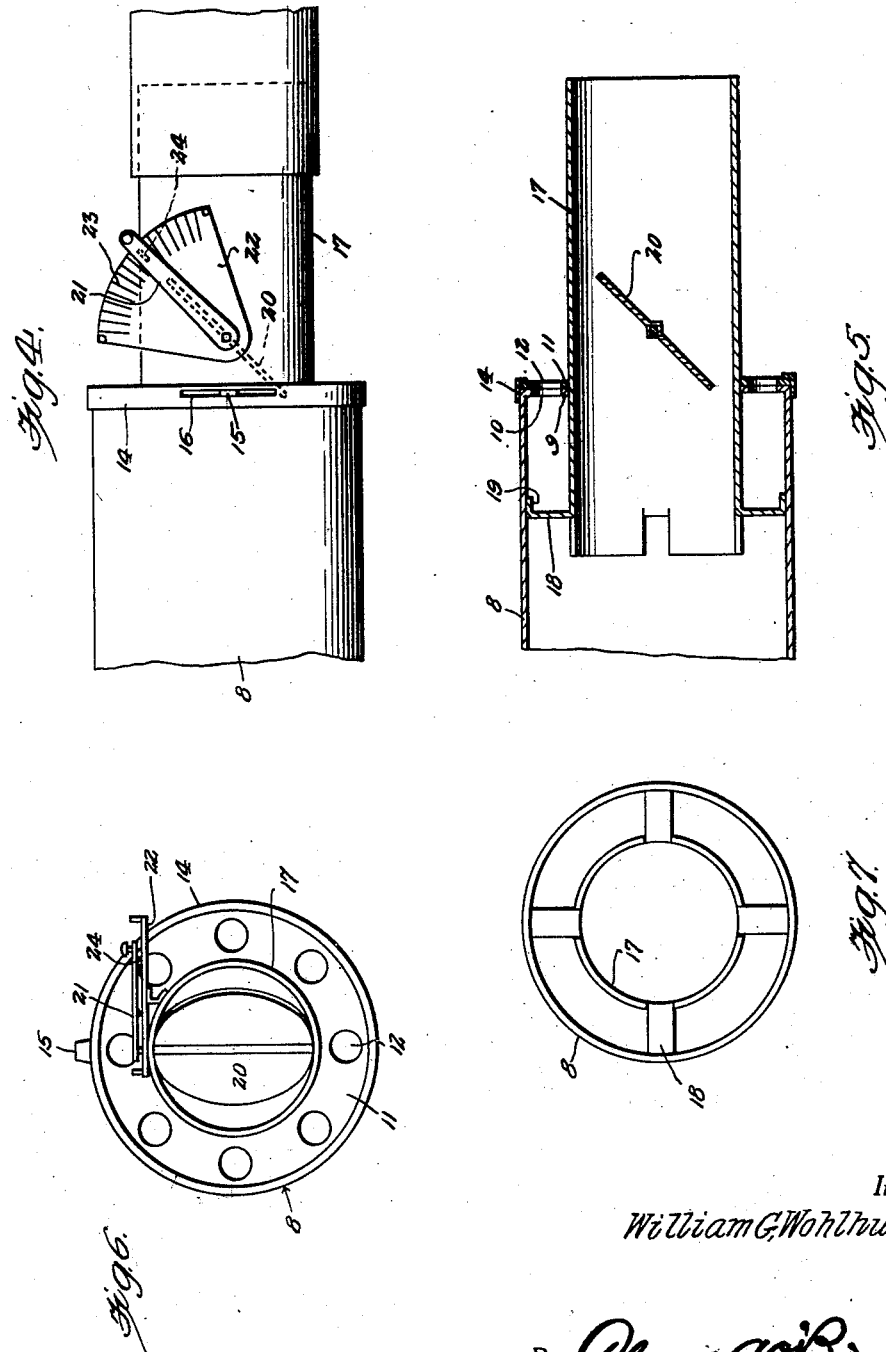
Inventor
William G. Wohlhuter,
By Clarence A. O'Brien
Attorney Patented Apr. 1, 1930

1,752,715

UNITED STATES PATENT OFFICE

WILLIAM G. WOHLHUTER, OF SHERBURN, MINNESOTA

WINDSHIELD HEATER

Application filed April 9, 1929. Serial No. 353,818.

The present invention relates to windshield heaters and more particularly to a heater device associated with the windshield of a motor vehicle for the purpose of preventing the accumulation of moisture, snow and ice upon the glass windshield and to insure clear vision through the windshield at all times.

Another very important object of the invention resides in the provision of a windshield heater of this nature which is simple in its construction, inexpensive to manufacture and install, thoroughly efficient and reliable in use and otherwise well adapted to the purpose for which it is designed.

With the above and numerous other objects in view as will appear as the description proceeds, the invention resides in certain novel features of construction, in the combination and arrangement of parts as will be hereinafter more fully described and claimed.

In the drawing:

Figure 1 is a sectional view through the forward portion of an automobile showing my improved wind-shield heater associated therewith, Figure 2 is a transverse vertical section through the stove, Figure 3 is an elevation of the distributor, Figure 4 is a fragmentary top plan view of one end of the stove, Figure 5 is a longitudinal section therethrough, Figure 6 is an end elevation of the neck of the stove, and Figure 7 is an end elevation of the neck extension.

Referring to the drawing in detail it will be seen that the numeral 5 denotes a stove forming a heating chamber associated with the exhaust pipe manifold 6 of the automobile engine 7 and at the rear end thereof merging into a cylindrical neck extension 8 having an inturned end flange 9 provided with a plurality of apertures 10.

A ring 11 provided with apertures 12 is mounted for rocking movement on the flange 9 by suitable means 14 and has a lever 15 extending therefrom through a slot 16 in the upper portion of the member 14 so that the ring may be shifted to register apertures 12 with apertures 10 to the degree desired.

A tubular sleeve 17 is slidable through the ring 11 and flange 9 and at its inner end is provided with outwardly directed ears 18 with a rim on the terminals thereof as indicated at 19 for sliding inside the neck 8. A valve 20 is rockable in the tubular sleeve and controllable by a lever 21.

A plate 22 is mounted on the tubular sleeve and has teeth 23 with which is engageable projections 24 on the lever for holding the lever in the desired position after the valve 20 has been adjusted. A conduit 25 extends from the sleeve 17 and may be engaged by suitable means 26 on a steering column 27.

The numeral 28 denotes a windshield. A tubular elongated heat distributing member 29 is provided with apertures 30 to direct the heat against the inside of the wind-shield 28 and the conduit 25 is connected therewith.

As the car is moving along the heat from the exhaust manifold 6 is collected in the chamber formed by the stove 5 and passed through the neck 8 and if too much heat is present, the ring 11 may be adjusted so as to allow the desired amount to escape into the interior of the automobile for heating purposes. The remaining heat will pass through the tubular sleeve 17, conduit 25 and be distributed along the bottom of the windshield 28.

By applying heated air to the interior of the windshield, it is sufficiently heated to melt the inner film or surface of the ice and allow it to slide down off the wind shield. It is not necessary to completely melt the ice when the heat is applied to the internal surface as a little heat will loosen it.

The internal heating also removes and prevents condensation on either side of the windshield thus giving the driver a clear vision at all times as well as a windshield which can be easily wiped by the usual well known means.

It is thought that the construction, operation, utility and advantages of this invention will now be quite apparent to those skilled in this art without a more detailed description thereof.

The present embodiment of the invention has been disclosed in detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a device of the class described, a stove forming a chamber for disposal over the exhaust manifold of an internal combustion chamber, the rear end of the stove merging into a cylindrical neck having an inturned terminal flange formed with a plurality of apertures, a sleeve extending to the flange, a ring mounted for rotation on the flange and having a plurality of apertures, and means for rotating the ring to control the registration of said apertures.

2. In a device of the class described, a stove forming a chamber for disposal over the exhaust manifold of an internal combustion chamber, the rear end of the stove merging into a cylindrical neck having an inturned terminal flange formed with a plurality of apertures, a sleeve extending to the flange, a ring mounted for rotation on the flange and having a plurality of apertures, and means for rotating the ring to control the registration of said apertures, a valve means in the sleeve.

3. In a device of the class described, a stove forming a chamber for disposal over the exhaust manifold of an internal combustion chamber, the rear end of the stove merging into a cylindrical neck having an inturned terminal flange formed with a plurality of apertures, a sleeve extending to the flange, a ring mounted for rotation on the flange and having a plurality of apertures, and means for rotating the ring to control the registration of said apertures, a valve means in the sleeve, the inner end of the sleeve being provided with outwardly directed ears merging into an annular member slidable interiorly of the neck.

4. In a device of the class described, a stove forming a chamber for disposal over the exhaust manifold of an internal combustion chamber, the rear end of the stove merging into a cylindrical neck having an inturned terminal flange formed with a plurality of apertures, a sleeve extending to the flange, a ring mounted for rotation on the flange and having a plurality of apertures, and means for rotating the ring to control the registration of said apertures, a valve means in the sleeve, the inner end of the sleeve being provided with outwardly directed ears merging into an annular member slidable interiorly of the neck, a conduit connected with the sleeve, an elongated tubular apertured distributor connected with said conduit.

In testimony whereof I affix my signature.

WILLIAM G. WOHLHUTER.